United States Patent [19]

Mori

[11] Patent Number: 4,610,501
[45] Date of Patent: Sep. 9, 1986

[54] LIGHT BY-PASSING DEVICE

[76] Inventor: Kei Mori, 3-16-3-501, Kaminoge, Setagaya-ku, Tokyo, Japan

[21] Appl. No.: 592,962

[22] Filed: Mar. 23, 1984

[30] Foreign Application Priority Data

Jun. 28, 1983 [JP] Japan ............................ 58-116434

[51] Int. Cl.[4] ........................ G02B 6/28; G02B 6/36; G02B 6/24
[52] U.S. Cl. ........................ 350/96.10; 350/96.15; 350/96.20; 362/32
[58] Field of Search ............... 350/96.10, 96.15, 96.16, 350/96.20; 362/32

[56] References Cited

U.S. PATENT DOCUMENTS

| 3,844,171 | 10/1974 | Rodger | 350/96.19 X |
| 4,148,558 | 4/1979 | Schuck | 350/96.18 X |
| 4,406,513 | 9/1983 | Raphael | 350/96.16 |

*Primary Examiner*—William L. Sikes
*Assistant Examiner*—Akm E. Ullah
*Attorney, Agent, or Firm*—Jordan and Hamburg

[57] ABSTRACT

A light by-passing device is connected in cascade between transparent cylindrical optical conductors, and is used for the purpose of by-passing and taking out a part of the light transmitted through them. Said light by-passing device is comprised of first and second transparent cylindrical members and three spacers of the same thickness interposed between the first and second cylindrical members. The shape of the first and second cylindrical members' edge surfaces are opposed to each other through the spacers that have first horizontal water level surfaces, inclined surfaces following the first horizontal surfaces, and second horizontal water level surfaces following the inclined surfaces. The spacer interposed between the inclined surfaces has a round hole through which light passes. It also has a grasping part used to insert or take out.

8 Claims, 4 Drawing Figures

LIGHT BY-PASSING DEVICE

BACKGROUND OF THE INVENTION

The present applicant previously proposed various ideas for guiding the solar rays or artificial light focused by a lense or the like into an optical conductor and thereby transmitting it onto an optional, desired place through the optical conductor for the purpose of illumination or for other uses. Such a process would make it possible to by-pass and take out the light-energy transmitted through the optical conductor at the half-way point of transmission. Thereby the effect of the light-energy's use would be increased. Such a device would broaden the use of light energy.

SUMMARY OF THE INVENTION

It is therefore an object of the present invention to provide a light by-passing device having the function of effectively by-passing and taking out a part of the light energy transmitted through an optical conductor.

It is another object of the present invention to provide a light by-passing device which can be manufactured easily.

One aspect of the present invention is to provide a light by-passing device which is comprised of first and second transparent cylindrical members and three spacers of the same thickness interposed between the first and second cylindrical members. The shape of said first and second cylindrical members' edge surfaces are opposed to each other through said spacers that have first horizontal water level surfaces, inclined surfaces following said first horizontal surfaces, and second horizontal water level surfaces following said inclined surfaces. The first one of said spacers is interposed between said first horizontal surfaces. The second one of them is interposed between said inclined surfaces. The third one of them is interposed between said second horizontal surfaces. Finally said second spacer has a round hole.

DESCRIPTION OF THE PREFERRED EMBODIMENT

Figure 1:
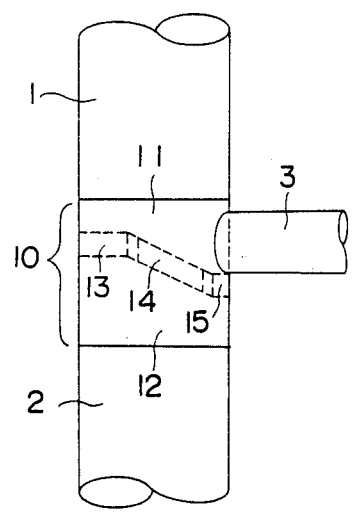
FIG. 1 is a diagram for explaining the usage of the light by-passing device according to the present invention.
Figure 2:
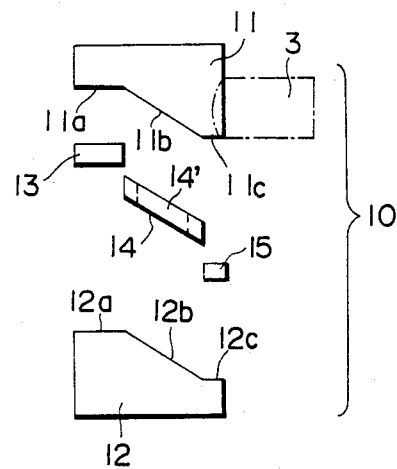
FIG. 2 is a detailed diagram of the light by-passing device according to the present invention.

FIG. 1 is a diagram explaining the usage condition of the light by-passing device according to the present invention. In FIG. 1, 1 and 2 are cylindrical optical conductors; 10 is a light by-passing device according to the present invention; and 3 is an optical conductor through which the light energy by-passing device 10 is guided and transmitted. The edge surface of the optical conductor 1 is not shown in the diagram but is arranged at the focus of the lense for focusing the solar rays or the artificial light. The light energy focused by the lense is guided into the optical conductor 1. The light energy thus guided into the optical conductor 1 is transmitted through the light conductor 2 onto the optional desired place and used for illumination or other purposes. When the light by-passing device 10 is interposed between the optical conductors 1 and 2, a part of the light energy is by-passed and transmitted through the by-passing optical conductor 3 onto the optional desired place.

Figure 3:
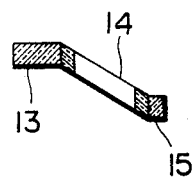
FIG. 3 is a diagram showing the unitarily combined spacers used in the light by-passing device and a cross-sectional view of the spacers cut along the line III—III as shown in FIG. 4.
Figure 4:
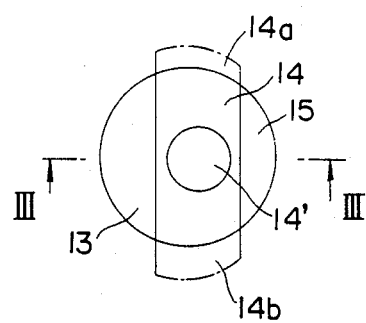
FIG. 4 is a plane view of FIG. 3.

FIG. 2 is a detailed, exploded view of the above-mentioned light by-passing device according to the present invention. In FIG. 2, 11 is a first transparent, cylindrical member; 12 is a second transparent, cylindrical member; 13 through 15 are transparent spacers interposed between cylindrical members 11 and 12 as shown in FIG. 1. Namely, the first and second cylindrical members 11 and 12 are so formed that their edge surfaces are opposed to each other through the spacers 13 through 15. They are respectively on the first horizontal surfaces 11a and 12a, the inclined surfaces 11b and 12b, and the second horizontal surfaces 11c and 12c. On the other hand, the spacers 13 through 15 are formed in the same thickness. They are also constructed so as to be interposed between the first horizontal surfaces, the inclined surfaces, and the horizontal surfaces respectively. A round hole 14' is bored in the second spacer 14. FIG. 3 is a diagram showing a side cross-section of the unitarily combined spacers 13 through 15 and a cross-sectional view of spacers cut along the line III—III as shown in FIG. 4. FIG. 4 is a plane view of FIG. 3. The aforementioned spacers 13 through 15 are shown independent of each other. When assembled the spacers are unitarily combined by means of optical paste, and then the combined spacers are firmly fixed by means of the same paste so as to interpose them between the cylindrical members 11 and 12. The other respective members, 11 through 15, are independently produced and then assembled with the same optical paste. Therefore the manufacturing and assembling and alignment of those members 11 through 15, easily can be done simply and with high accuracy. According to the present invention, the light by-passing device is connected in cascade fashion between the optical conductors 1 and 2 for its usage. However, when the light energy transmitted through the optical conductor 1 reaches the inclined surface 11b of the first cylindrical member 11, the spacer 14, having the hole 14', is interposed on the inclined surface so that the refractive index largely changes at the hole. Then the light energy is reflected by a prism action on the surfaces opposed to the hole 14' of the inclined surface 11b and it is guided in the direction of the radius. Around the light by-passing device 10, the optical conductor 3 for by-passing is bound by the use of an optical paste on the opposite side of the inclined surface. As mentioned heretofore, the reflected light-energy is guided into the optical conductor 3 for by-passing and being transmitted onto the optional desired place for its usage.

An embodiment of the light by-passing device according to the present invention was explained heretofore. However, the present invention is not limited to the afore-mentioned description. Various modifications can be realized. Though the description given above relates to only the case of unitarily fixed members, such as 11 through 15 as an example, if the members are flexibly constructed by the use of optical oil or the like, instead of unitarily fixing the second spacer 14, it may turn out to be possible to adjust the amount of light energy that is by-passed into the optical conductor 3 i.e. by adjusting the extent of insertion of the spacer 14. Further, supposing that a grasping portion 14a is made longer on the spacer 14 as shown in FIG. 4 with a onedot-chained line, the insertion and withdrawal of the spacer 14 might become considerably easier. When the hole 14′ of the spacer 14 comes out from the inclined surface and the remaining portion 14b of the spacer 14 remains on the inclined surface, the light energy guided into the light by-passing device is transmitted into the optical conductor 2 without being by-passed by the light by-passing device. Further, as to the optical conductor 3 for by-passing, it may be possible to bind the optical conductor having a sufficient desired length required for guiding the by-passed light to the usage position to the light by-passing device 10 by use of an adhesive agent at the actual working spot. Furthermore, it may also be possible to unitarily produce a by-passing optical conductor 3 of a predetermined length as well as a first cylindrical member 11 using the same manufacturing process, and to connect the optical conductor of the desired length co-axially to the by-passing optical conductor at the actual working spot. Though only one example of connecting the single light by-passing device between the optical conductors 1 and 2 is explained heretofore, it may be possible to connect several by-passing devices. On that occasion, supposing that the hole 14′ of the by-passing device, connected forward, is larger than the hole of that connected backward in its diameter, it may be possible almost equally to by-pass all the light from the by-passing device.

It is apparent from the above-mentioned description, that the light by-passing device, having the function of effectively by-passing light energy can be manufactured easily according to the present invention.

What is claimed is:

1. A light by-passing device comprising first and second transparent optical rod conductors each having a longitudinal end opposed and spaced from one another, each of said longitudinal end having a first, second and third surface, said first and third surface of each longitudinal end being disposed in a plane perpendicular to the longitudinal axis of the respective optical rod conductor, said second surface of each longitudinal end extending between the respective first and third surface and being inclined at an acute angle relative to the longitudinal axis of the respective optical rod conductor, spacer means having a first, second and third portion disposed respectively between said opposed first, second and third surfaces of said two optical rod conductors, said first, second and third spacer portions all being of the same thickness corresponding to the spacing between said first and second optical rod conductors, said second spacer portion having an opening such that light energy transmitted through one of said optical rod conductors passes to a section of said second surface of said one optical rod conductor which is adjacent said opening and is reflected in a lateral direction to thereby by-pass the light energy transmitted by said one optical rod conductor.

2. A light by-passing device according to claim 1 further comprising means for fixing said first and third spacer portions in said space between said longitudinal ends of said optical rod contors, and means for movably mounting said second spacer portions relative to said first and second spacer portions such that said opening in said second spacer portion is movable into a position to preclude by-passing of said light energy.

3. A light by-passing device according to claim 2, wherein said second spacer portion is generally inclined at an acute angle relative to the axis of said first and second optical rod conductors, said second spacer portion having at least one extending section which extends laterally relative to the axes of the optical rod conductors, said extending section being adaptable to be grasped for moving said second spacer portion relative to the axes of said optical rod conductors.

4. A light by-passing device according to claim 1 further comprising a by-pass optical conductor mounted on said one optical rod conductor for receiving said by-passed light energy.

5. A light by-passing device according to claim 4, wherein said second inclined surface of said one optical rod conductor reflects the light energy transmitted at said hole by said one optical rod conductor, said by-pass optical conductor being mounted on said one optical rod conductor to receive said reflected light.

6. A light by-passing device according to claim 4 further comprising paste means mounting said by-pass conductor on said one optical rod conductor.

7. A light by-passing device according to claim 1, wherein said first, second and third spacer portions are separately formed, and paste means securing said first and second portions together and to said first and second optical rod conductors.

8. A light by-passing device for by-passing and taking out a part of the light being transmitted by optical conductors, comprising first and second transparent optical rod conductors each having a longitudinal end opposed and spaced from one another, each of said longitudinal ends having a first, second and third surface, said first and third surface of each longitudinal end being disposed in a plane perpendicular to the longitudinal axis of the respective optical rod conductor, said second surface of each longitudinal end extending between the respective first and third surface and being inclined at an acute angle relaive to the longitudinal axis of the respective optical rod conductor, one of said optical rod conductors having a by-pass conductor connected thereto through which by-pass light energy is guided and transmitted, spacer means having a first, second and third portion disposed respectively between said opposed first, second and third surfaces of said two optical rod conductors, said first, second and third portions all being of the same thickness corresponding to the spacing between said first and second optical rod conductors, said second spacer portion having an opening such that light energy is transmitted through one of said optical rod conductors to a section of said second surface of said one optical rod conductor which is adjacent said opening and is reflected and by-passed to said by-pass optical conductor.

* * * * *